(12) United States Patent
Quattrini

(10) Patent No.: US 12,342,741 B2
(45) Date of Patent: Jul. 1, 2025

(54) AGRICULTURAL TOOL-HOLDER

(71) Applicant: DONDI S.P.A., Bastia Umbra (IT)

(72) Inventor: Roberto Quattrini, Todi (IT)

( * ) Notice: Subject to any disclaimer, the term of this patent is extended or adjusted under 35 U.S.C. 154(b) by 491 days.

(21) Appl. No.: 17/758,818

(22) PCT Filed: Jan. 21, 2021

(86) PCT No.: PCT/EP2021/051341
§ 371 (c)(1),
(2) Date: Jul. 14, 2022

(87) PCT Pub. No.: WO2021/151776
PCT Pub. Date: Aug. 5, 2021

(65) Prior Publication Data
US 2023/0041427 A1     Feb. 9, 2023

(30) Foreign Application Priority Data

Jan. 31, 2020   (IT) .......................... 102020000001912

(51) Int. Cl.
*A01B 63/02*       (2006.01)
*A01B 63/10*       (2006.01)

(52) U.S. Cl.
CPC .......... *A01B 63/023* (2013.01); *A01B 63/026* (2013.01); *A01B 63/10* (2013.01)

(58) Field of Classification Search
CPC ...... A01B 63/023; A01B 63/026; A01B 63/10
See application file for complete search history.

(56) References Cited

U.S. PATENT DOCUMENTS 6,935,435 B1   8/2005   Shenk

FOREIGN PATENT DOCUMENTS

| EP | 2030495 A1 | 3/2009 |
| EP | 2361496 A1 | 8/2011 |
| ES | 1056860 U | 5/2004 |
| ES | 2555356 A1 | 12/2015 |
| WO | 2010130265 A1 | 11/2010 |

OTHER PUBLICATIONS

International Search Report for corresponding PCT/EP2021/051341 dated May 3, 2021.
Written Opinion of the International Searching Authority for corresponding PCT/EP2021/051341 dated May 3, 2021.

*Primary Examiner* — Tara Mayo
(74) *Attorney, Agent, or Firm* — Egbert, McDaniel & Swartz, PLLC

(57) ABSTRACT

Agricultural tool-holder having a central chassis with a coupling system for coupling with a tractor and at least one lateral chassis that can slide closer to or away from the central chassis, which has a longitudinal axis and includes an adjacent parallel pair of tubular beams orthogonal to the longitudinal axis and suitable for slidingly receiving two rods provided in the lateral chassis, moved by a main actuator mounted in the central chassis.

8 Claims, 6 Drawing Sheets

AGRICULTURAL TOOL-HOLDER

The present invention relates to an agricultural tool-holder.

The agricultural tool-holder of the invention has been devised for being preferably used with an inter-row unit.

An inter-row unit is a device used in agriculture, and particularly in vineyards or orchards, to work the terrain under the row between two plants. Such a device is a mechanical system characterized by a straddle lever mechanism used to retract the working tool from its position to go around the trunk without damaging the plant. The presence of the vine is identified by a rod feeler that actuates the lever mechanism (generally of hydraulic type), thus moving the tool.

A single inter-row unit is not an operating system and must be integrated in another equipment, generally a tool-holder chassis that performs the following tasks:
- it supports one inter-row unit (in the case of single machines) or two inter-row units (in the case of double machines that simultaneously work the under-foliage on the right-hand side and the left-hand side) in the correct position with respect to the row in terms of distance, working depth and tool inclination;
- it houses the parts for coupling with the tractor, generally by means of a standard three-point hitch for the rear or front linkage of the tractor;
- it houses the parts (generally hydraulic parts) that are necessary to power the inter-row unit and to actuate the movements for positioning the inter-row unit correctly and executing the maneuvers in headland.

From an operating viewpoint, the ranges of distribution in orchards and vineyards are characterized by narrow working/maneuvering spaces, often with a high inclination. Consequently, the tractors that are specifically designed for these sectors are very compact, lightweight, and low-power tractors. In view of the above, the agricultural machines that are coupled with these tractors must have a reduced size and a reduced weight in order to guarantee easy and safe use.

The tool-holders that are currently available on the market can be divided into two macro-categories, according to the characteristics of the mobile parts used for positioning the inter-row unit.

A first macro-category is generally defined as "tool-holder with one-beam chassis". In this first type of tool-holders, the inter-row unit is anchored and supported by a one-beam structure that slides over a tubular seat. In case of double machines, the chassis is made of two tubular elements, and each tubular element acts as a seat to slidingly house a mobile element.

This solution is impaired by the following drawbacks:
- the mechanical resistance is low because the stress is completely discharged on a single projecting beam;
- since the weight of the machine is concentrated in the central part, the ends of the extensions are not adequately loaded, thus resulting in a poor penetration of the tools and in a lower working efficacy;
- the lack of symmetry relative to the forward travel direction may determine a misalignment of the right-hand and left-hand working tools in case of double machines;
- the optional adjustment of the working inclination of the tool requires the use of an additional plate, with a significant volume increase;
- the supporting wheels are generally anchored to the central chassis and therefore their position does not vary with the working width of the machine; this determines a poor stability of the assembly in the configurations in which the extensions are partially extended; moreover, given the position of the wheels, the adjustment of the depth is very limited and sometimes the wheels are fixed, without the possibility of adjusting the height; for such a reason, a complicated, cumbersome additional system must be installed at the end of the extension in order to adjust the working depth of the tool, thus increasing the overall volume.

The prior art comprises a second category of tool-holders that is technically defined as "tool-holders with two-beam chassis". In this second type of tool-holders, the inter-row unit is anchored and supported by a two-beam structure that slides on two tubular seats. In case of double machines, the chassis is generally made of four tubular elements, and each pair of tubular elements acts as a seat to slidingly house each mobile element. Although such a system is considerably sturdier and stronger than the previous one, it is impaired by its excessive weight and volume, with consequent management problems with vineyard and orchard tractors.

Moreover, such a geometrical configuration is impaired by additional critical issues. Firstly, in this case also, the lack of symmetry relative to the forward travel direction often determines a misalignment of the right-hand and left-hand working tools in case of double machines.

An additional problem is the complicated application of the tool-holder to the front and rear linkage of the tractor. For this reason, the following solutions are generally adopted to solve such a problem: application of a double fixed coupling system, both in the front and in the rear, or use of a removable coupling system that can be suitably mounted according to the specific use. However, both solutions will determine an additional increase of weights and volumes.

WO2010/13026A1 discloses an agricultural tool-holder according to the preamble of claims 1.

ES1056860U discloses a telescopically extensible chassis for agricultural tilling.

U.S. Pat. No. 6,935,435B1 discloses a positionable cultivating apparatus for raised bed crops having transversely opposing sub-chassis slidably mounted in the main chassis of the implement to permit lateral positional adjustment of work implements carried by the sub-chassis.

The purpose of the present invention is to disclose an agricultural tool-holder that is not impaired by the drawbacks and the limitations of the tool-holders with one-beam or two-beam chassis of the prior art.

This purpose is achieved according to the present invention with the characteristics of the independent claim 1.

Advantageous embodiments of the invention will appear from the dependent claims.

For the sake of clarity, the description of the agricultural tool-holder according to the invention continues with reference to the appended drawings, which have a merely illustrative, not limiting value, wherein.

Figure 1:
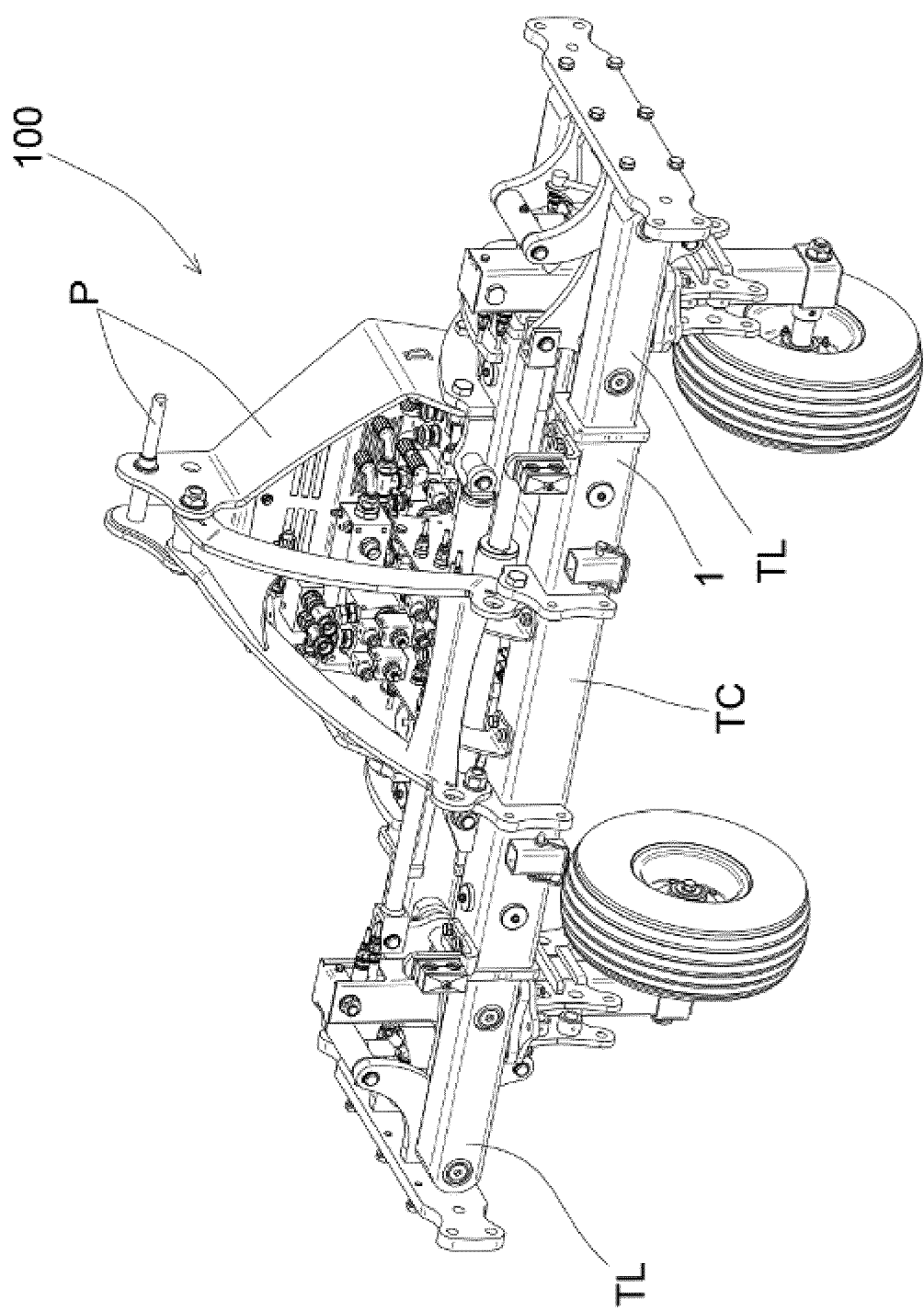
FIG. 1 is an axonometric view of tool-holder according to the invention.
Figure 2:
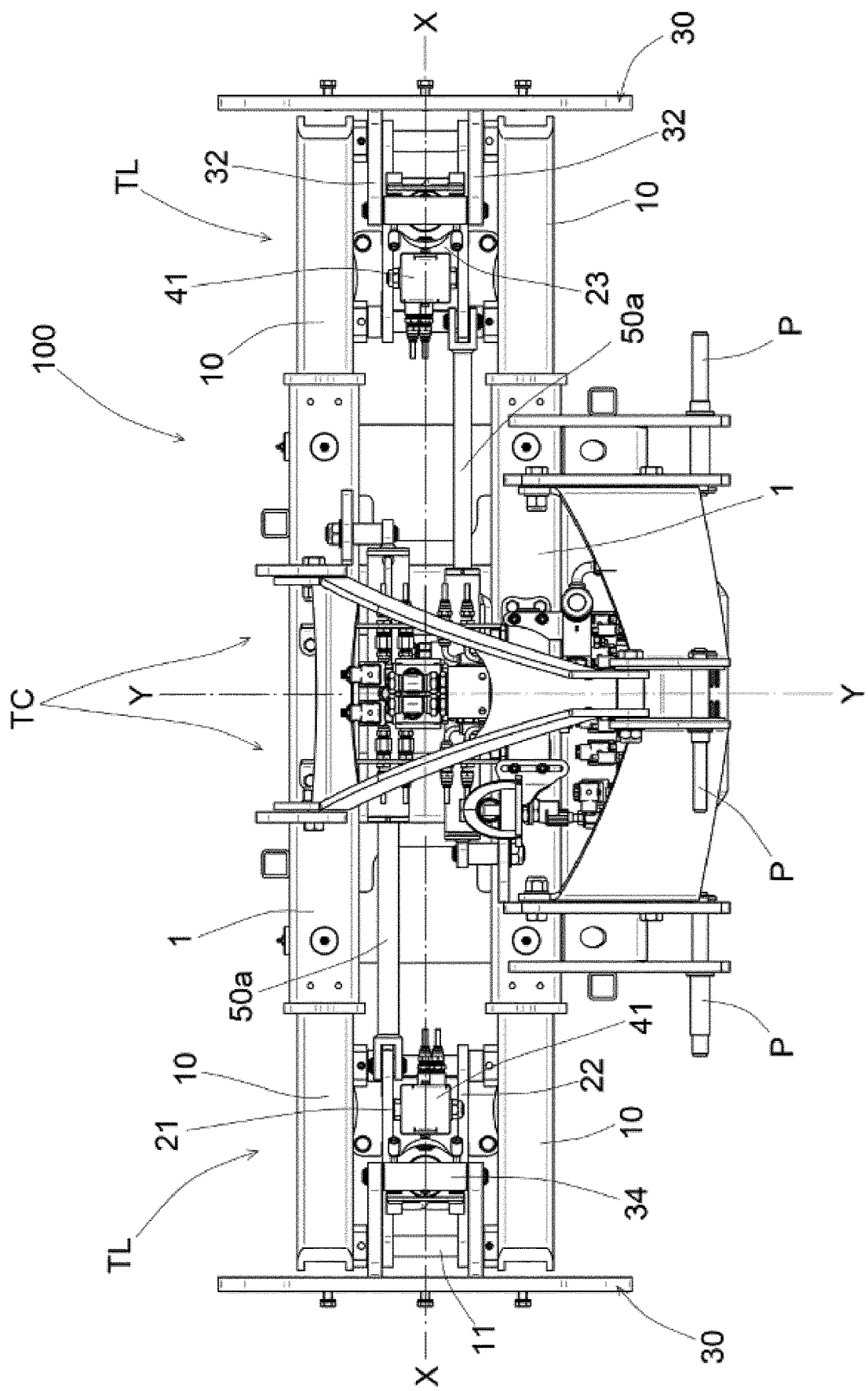
FIG. 2 is a top view of the tool-holder of FIG. 1.
Figure 3:
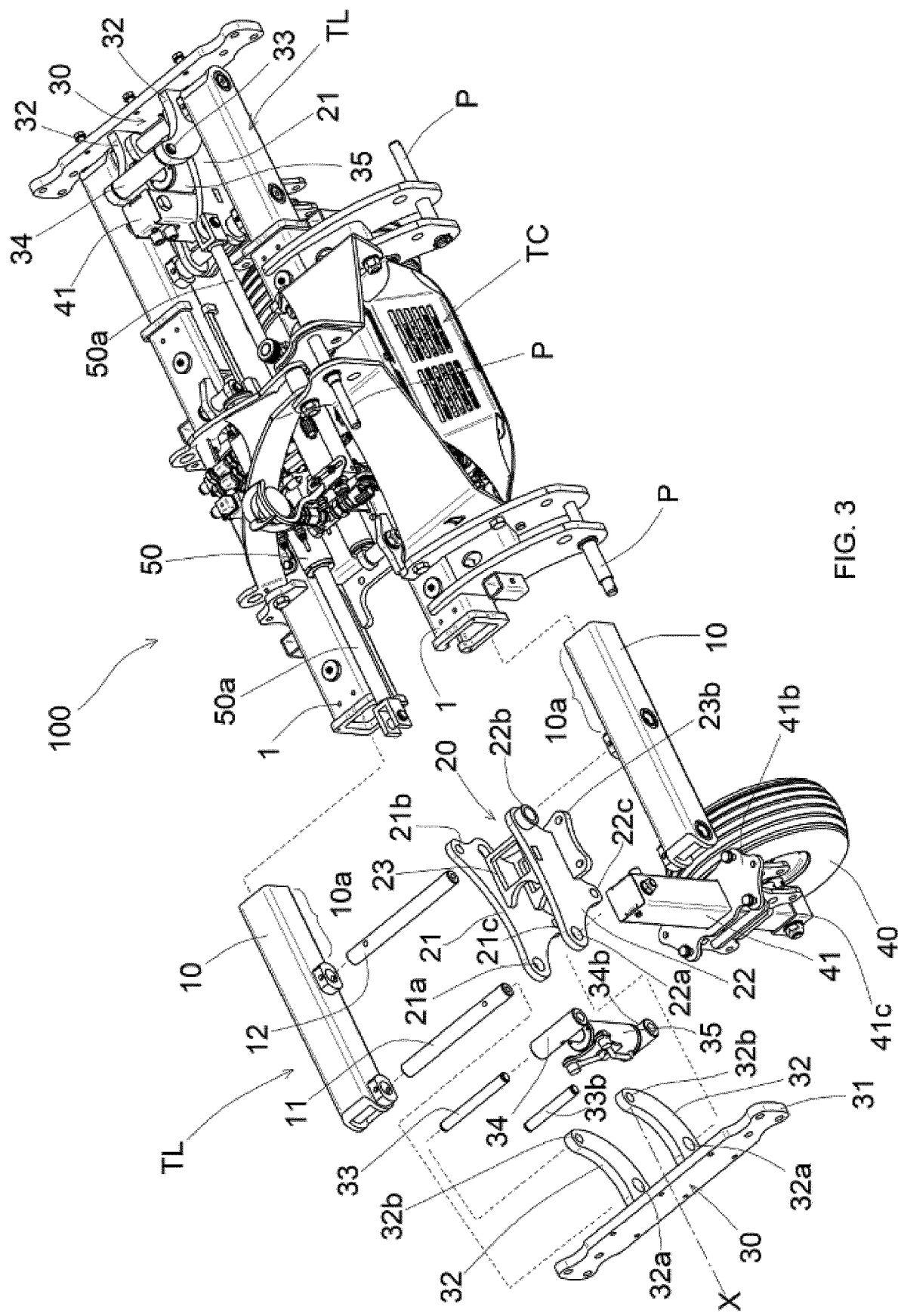
FIG. 3 is an exploded axonometric view of the tool-holder according to the invention.

With reference to FIGS. 1, 2 and 3, the agricultural tool-holder (100) of the invention comprises a central chassis (TC) that supports a coupling system (P) for coupling with an agricultural tractor. The coupling system (P) can advantageously be a three-point coupling system of the prior art. The coupling system (P) and the central chassis (TC) house all the hydraulic and electrical parts that are necessary for moving the articulated parts of the tool-holder (100) and of the tools installed in the tool-holder (100) that need to be moved.

The central chassis (TC) supports a pair of lateral chassis (TL) that project from opposite sides. Each lateral chassis (TL) can slide closer to or away from the central chassis (TC), translating along a transverse axis (X) orthogonal to a longitudinal axis (Y) that corresponds to the forward traveling direction of the tractor that transports the tool-holder (100). The longitudinal axis (Y) coincides with an axis of symmetry of the central chassis (TC).

The central chassis (TC) comprises a pair of tubular beams (1) disposed in parallel position along an orthogonal direction to the longitudinal axis (Y) of the central chassis (TC). Each tubular beam (1) has a square section.

Each lateral chassis (TL) comprises a pair of rods (10) disposed in parallel position. Each rod (10) has a square section. The rods (10) are suitable for being inserted and sliding telescopically inside the tubular beams (1). The tubular beams (1) of the central chassis telescopically support the rods (10) of the lateral chassis (TL).

The two rods (10) of a pair of rods are rigidly connected by means of two spacing bars (11, 12) that are interposed and screwed to the rods (10). A first spacing bar (11) is disposed in the proximity of one end of the rods (10). A second spacing bar (12) is disposed in correspondence of the center of the rods (10), in such a way that the rods (10) can be inserted in the tubular beams (1) of the central chassis (TC) for a section (10a) equal to approximately half of their length.

Said pair of spacing bars (11, 12) acts as support for a bridge element (20) with a peculiar geometrical configuration, suitable for supporting a tool-holding plate (30) and a depth wheel (40). In agricultural machines, the depth wheel (40) is used to adjust the soil working depth of the tool.

The bridge element (20) comprises a pair of flanges (21, 22) with collars (23 and 23b) with vertical axis interposed and welded to the flanges (21 and 22), said collars being suitable for slidingly receiving and blocking a leg (41) that supports the depth wheel (40), with possibility of vertical adjustment.

The depth wheel (40) is blocked by means of a plate (41b) that is coupled with bolts on the lower collar (23b), with the same shape.

The vertical adjustment of the depth wheel is obtained by means of the telescopic sliding of a tubular element (41c) that supports the wheel inside the leg (41).

The flanges (21, 22) are provided with holes (21a, 22a, 21b 22b) for the insertion of the spacing bars (11, 12) and the bridge element (20) is mounted astride said spacing bars (11, 12).

Moreover, the bridge element (20) acts as support for the tool-holding plate (30). The tool-holding plate (30) comprises a flange (31) provided with a pair of brackets (32) in projecting position, said brackets (32) having a sickle-like shape and being provided at the proximal ends with proximal holes (32a) for the insertion of said spacing bar (11) that acts as supporting and pivoting pin for said tool-holding plate (30).

The pair of sickle-shaped brackets (32) is provided at the distal ends with respect to the flange with distal holes (32b) wherein a pin (33) is inserted and blocked inside a sleeve (34), it being an integral part of an auxiliary actuator (35) in order to automatically adjust the inclination of the tool-holding plate (30). Advantageously, the auxiliary actuator (35) consists in a hydraulic jack.

The auxiliary jack (35) is connected to the bridge element (20) by means of a locking pin (33b) inserted in a sleeve (34b) of the actuator and in holes (22c, 21c) of the flanges (21, 22) of the bridge element. The inclination of the tool-holding plate (30) is adjusted by varying the length of the auxiliary actuator (35).

A tool-holder configuration without adjustment of the inclination of the tool-holding plate can be obtained by omitting the auxiliary actuator (35) and the pins (33, 33b), rotating the tool-holding plate (30) by 180° around the transverse axis (X) of the central chassis and blocking the tool-holding plate (30) by means of the bar (11), without having to add any functional parts and without increasing the width of the tool-holder.

A flange (21) of said pair of flanges of the bridge element is provided with a perforated shank (21b) for coupling the flange with a main actuator (50) installed on the central chassis (TC) and suitable for providing a thrust for moving the lateral chassis (TL) with respect to the central chassis (TC). Particularly, said main actuator (50) advantageously consists in a hydraulic jack comprising a stem (50a) suitable for being coupled with the perforated shank (21b) of the flange (21) of the bridge element. Obviously, two main actuators (50) are mounted on the central chassis (TC) for providing the thrust for moving the two lateral chassis (TL) with respect to the central chassis (TC), respectively.

A peculiarity of the agricultural tool-holder (100) according to the invention consists in the fact that all the parts used for each one of said lateral chassis (TL) are removably assembled in such a way that, in case of a broken or damaged part, the defective part can be disassembled and repaired, or replaced with a new part, without having to change the entire lateral chassis (TL).

Figure 5:
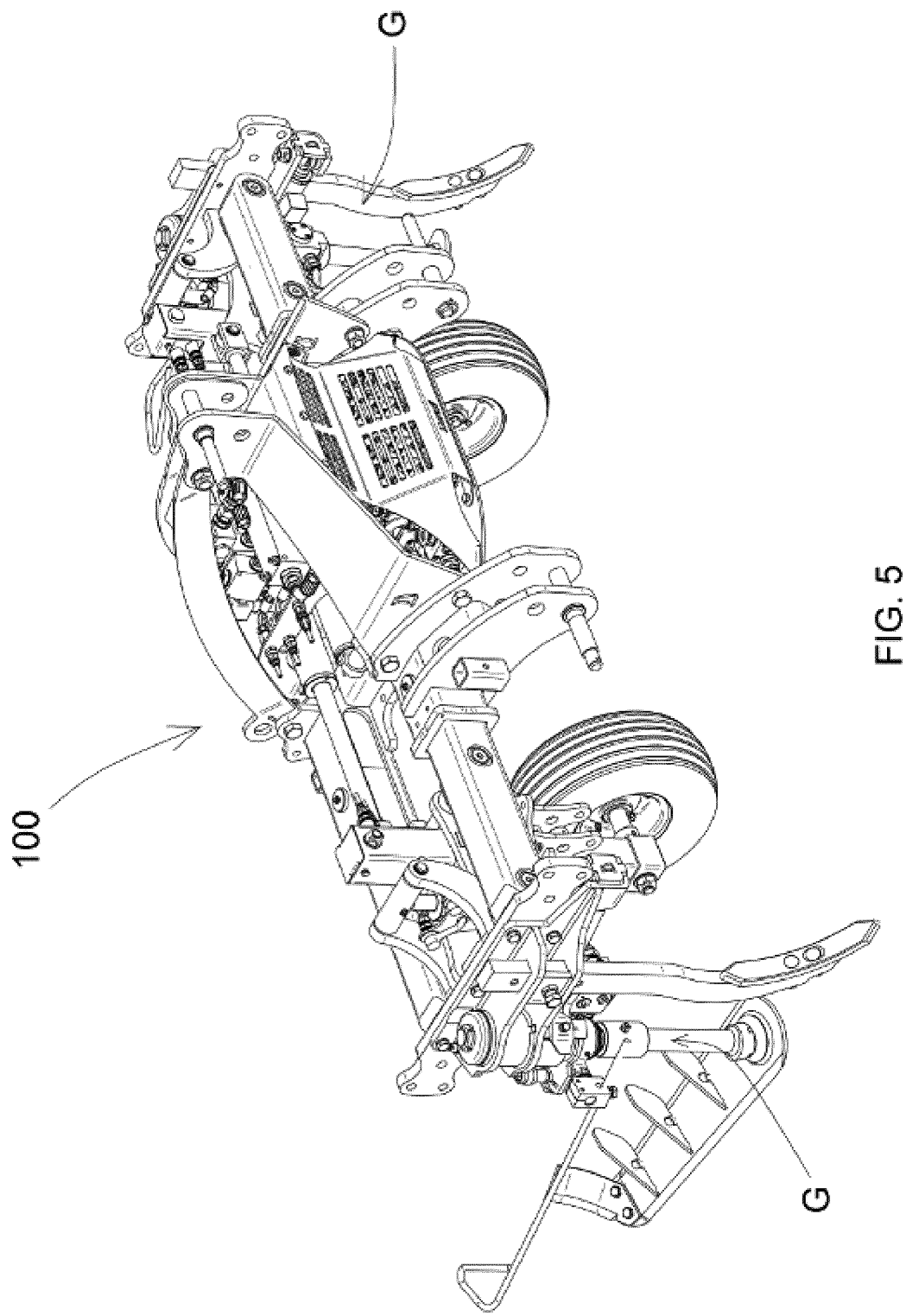
FIG. 5 is an axonometric view of the tool-holder according to the invention, with an opposite pair of inter-row units.

With reference to FIG. 5, the agricultural tool-holder (100) preferably supports tools consisting in inter-row units (G); however, any other type of tools, and not necessarily an inter-row unit, can be fixed on the tool-holding plate (30) by means of fixing bolts.

Figure 6:
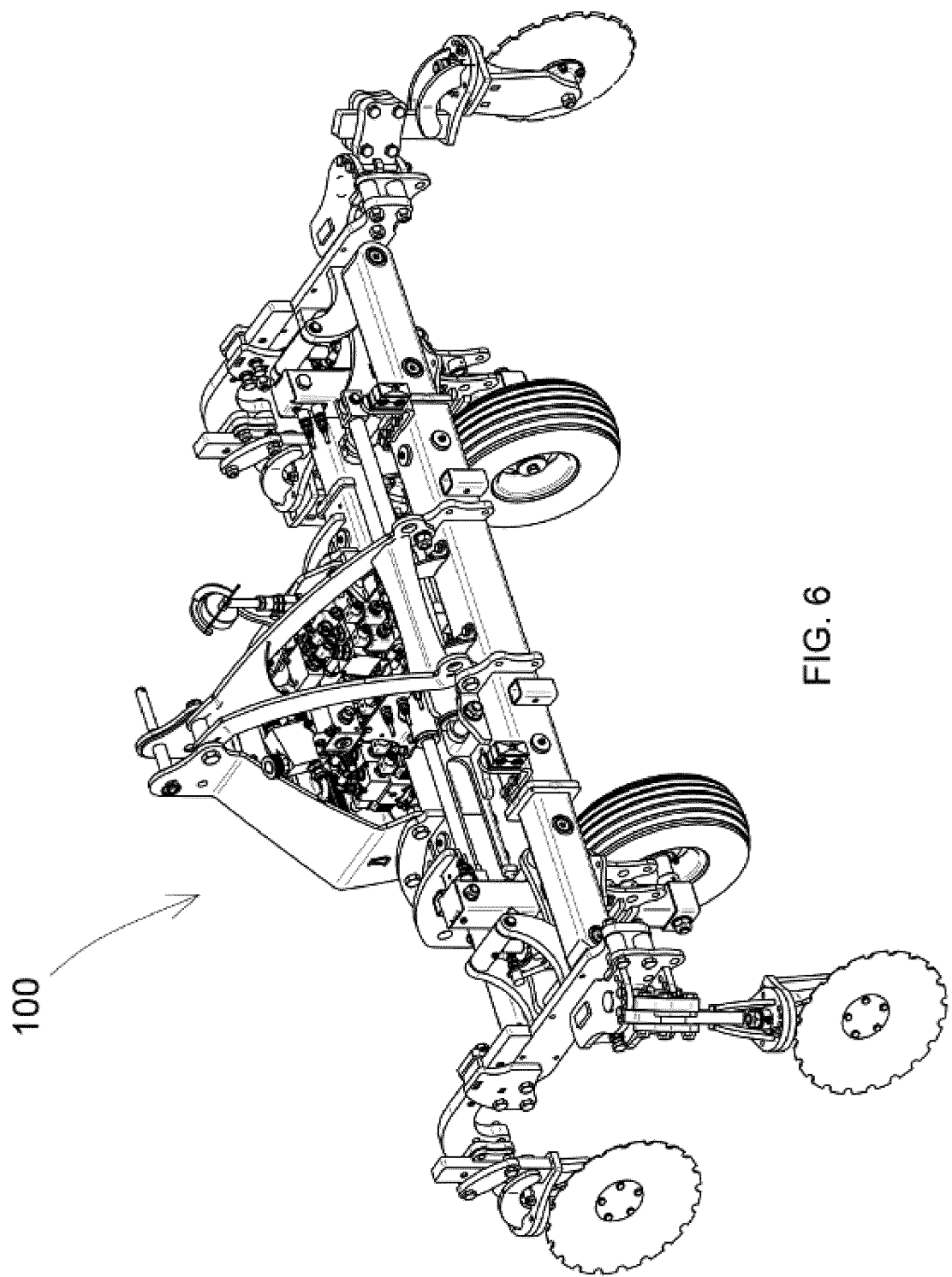
FIG. 6 is an axonometric view of the tool-holder according to the invention, without inter-row units and with a pair of filler disks.

FIG. 6 shows the tool-holder (100) provided with a pair of filler disks for working the sub-row, operating in the proximity of the plants, without reaching the space between two plants, and therefore without the need for an inter-row unit.

Figure 4:
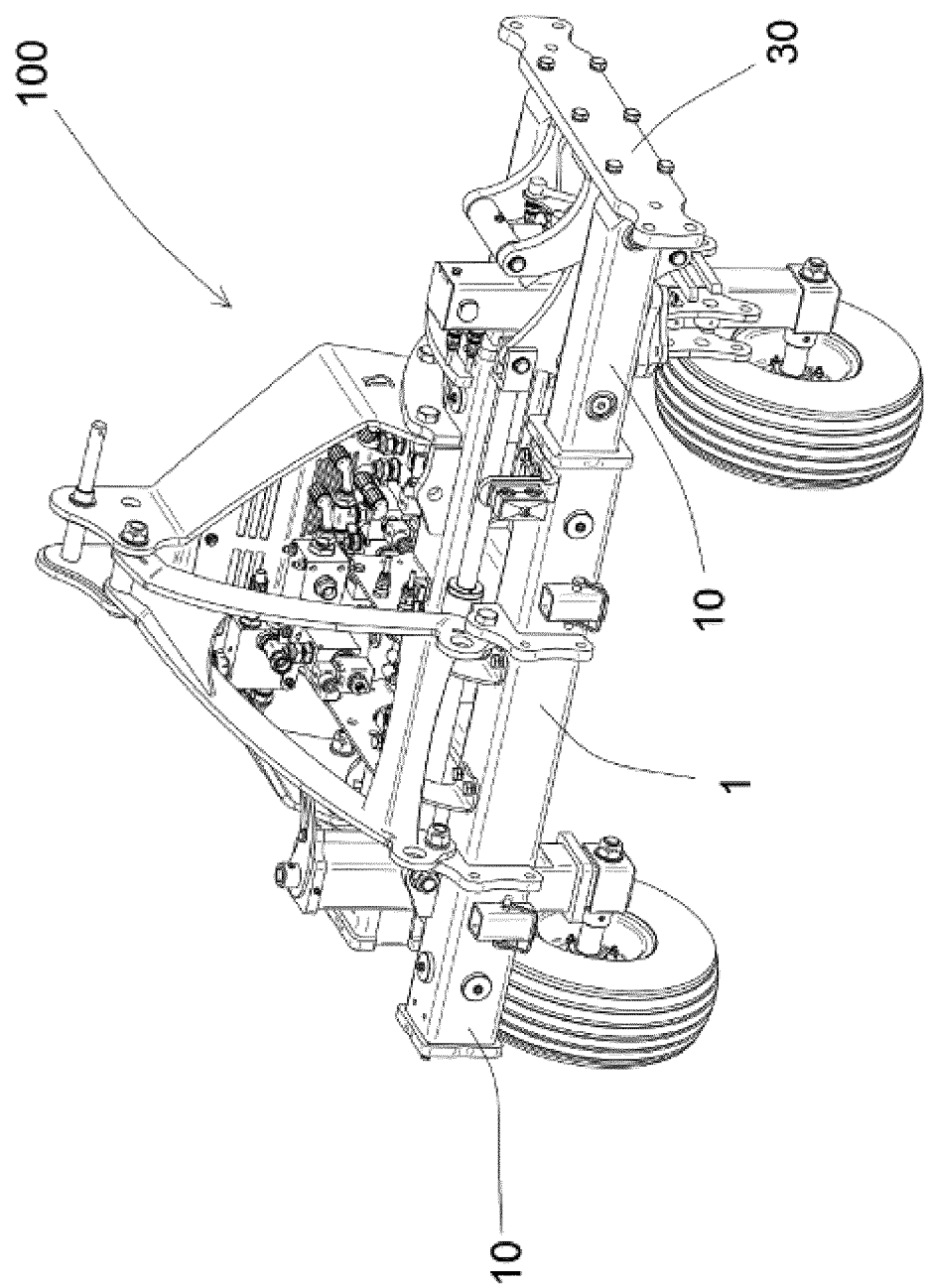
FIG. 4 is an axonometric view of the tool-holder according to the invention, with only one tool-holding plate.

As shown in FIG. 4, the agricultural tool-holder (100) can be used in combination with only one of said lateral chassis (TL) to configure a single tool-holder.

Both in the case of a single and a double tool-holder, the transverse axis (X) of the central chassis identifies an axis of symmetry for the tool-holder.

As shown in FIGS. 1 and 2, if the tool-holder (100) is used with a pair of lateral chassis (TL), the central chassis (TC) has two axes of symmetry that coincide with the longitudinal axis (Y) and the transverse axis (X). Such a double symmetry of the agricultural tool-holder (100) has several technical and functional advantages.

One of the main advantages consists in the possibility of coupling the tool-holder (100) with the tractor in the front and in the rear, by means of a simple right/left inversion of the inter-row units (G) or of the working parts, without any additional accessories or parts.

In case of a single tool-holder (FIG. 4), it will be simply necessary to invert the installation side (with respect to the longitudinal axis (Y)) of all the parts of the lateral chassis (TL) in order to convert the rear tool-holder into a front tool-holder.

The rationalization of the parts based on the perfect similarity of all the parts disposed in opposite positions with respect to the axes of symmetry (Y and X) allows for minimizing the production and sales costs, and also for simplifying the management of the warehouse and of the spare parts.

The agricultural tool-holder (100) according to the invention has the following additional peculiarities:
- because of its removably assembled configuration, the machine can be maintained easily and effectively, identifying the breakdown and replacing the defective or worn-out part rapidly;
- because of the modularity and the easy integration of the accessories, the machines are similar even in case of different functional configurations; optional systems can be installed easily, without increasing the volumes with respect to the basic configuration of the machine;
- because of the fact that the wheels (40) are housed in the sliding lateral chassis (TL) for adjusting the working depth, said wheels (40) follow the inter-row unit (G), always remaining in an optimal position with respect to the inter-row unit and guaranteeing the stability of the machine also in the completely extended configuration;
- because of the geometry of the tool-holding plate (30), the inter-row unit (G) can be combined or replaced with a set of front and/or rear accessories that are suitable for completing and/or improving the under-foliage work.

The agricultural tool-holder (100) of the invention is characterized by a compact geometry and an optimized weight, with the following additional advantages:
- a higher stability of the tractor/tool assembly, with higher safety during the work;
- the possibility of operating in terrains with a high inclination (which are typical of vineyards), and consequently the possibility of mechanizing disadvantaged agricultural regions;
- the possible installation on the front linkage of the tractor, without impairing its stability and without damaging the parts of the front axle (such a problem being typically experienced with the frontal use of machines that are currently available on the market with higher weight than the maximum weight recommended by the tractor manufacturer and/or with considerable jumps for the couplings);
- the possible use in tractors with lower power and smaller dimensions, with positive consequences in terms of economic sustainability (lower purchasing and maintenance costs, lower consumption, etc.) and agronomic sustainability (less trampling);
- an excellent maneuverability in headland and in reduced spaces (less downtime during works, higher exploitation of the agricultural soil with less turning areas, higher safety during critical maneuvers);
- a better visibility of the working tools because they are more proximal to the tractor and are not covered by the structural parts of the machine (with less stress for the operator and higher productivity).

The invention claimed is:

1. An agricultural tool holder comprising:
   a central chassis adapted to support a three-point coupling system for coupling with an agricultural tractor, said central chassis housing hydraulic and electrical parts that actuate articulated components of the tool holder;
   at least one lateral chassis mounted so as to be slideable toward or away from said central chassis, wherein said central chassis has an axis of symmetry and comprises a parallel pair of tubular beams disposed orthogonal to the axis of symmetry of said central chassis, wherein said at least one lateral chassis has a parallel pair of rods respectively inserted and slidable within the parallel of tubular beams so as to telescopically support said at least one lateral chassis; and
   at least one actuator cooperative with said at least one lateral chassis so as to move said at least one lateral chassis, said at least one actuator being mounted on said central chassis, wherein the parallel pair of rods are rigidly connected by a pair of spacing bars, one sparing bar of the pair of spacing bars being interposed between the parallel pair of rods and screwed to the parallel pair of rods, another spacing bar of the pair of spacing bars being interposed between the parallel pair of rods and screwed of the parallel pair of rods at a center of the parallel pair of rods, the parallel pair of rods being inserted into the respective parallel pair of tubular beam by a section equal to approximately one-half of a length of the parallel pair of rods.

2. The agricultural tool holder of claim 1, wherein the pair of spacing bars support a bridge element, the bridge element supporting a tool-holding plate and a depth wheel.

3. The agricultural tool holder of claim 2, wherein the bridge element has a pair of shaped flanges having holes therein, the holes allowing the pair of spacing bars to be inserted therein.

4. The agricultural tool holder of claim 3, wherein a pair of collars are interposed and welded between the pair of shaped flanges, wherein the depth wheel is supported by a leg, the leg being inserted inside the pair of collars.

5. The agricultural tool holder of claim 4, wherein said at least one actuator is a hydraulic jack having a stem, one of the pair of shaped flanges having a perforated shank to which the stem is coupled.

6. The agricultural tool holder of claim 3, wherein the bridge element supports the tool-holding plate, the tool-holding plate having a flange with a pair of brackets, each of the pair of brackets having a sickle shape and having a hole at an proximal end thereof into which the spacing bar is inserted.

7. The agricultural tool holder of claim 6, wherein each of the pair of brackets has a hole at a distal end thereof into which a pin is inserted, the pin having a sleeve.

8. The agricultural tool holder of claim 1, said at least one lateral chassis is a pair of identical lateral chasses support respectively on opposite sides of said central chassis, each lateral chassis of the pair of identical lateral cases being slidable toward or away from said central chassis along an orthogonal direction relative to the axis of symmetry of said central chassis.

* * * * *